United States Patent [19]

Rogan et al.

[11] 4,288,580

[45] Sep. 8, 1981

[54] CATALYST AND PROCESS FOR THE POLYMERIZATION OF ALPHA-OLEFINS

[75] Inventors: John B. Rogan, Glen Ellyn; Charles K. Buehler, Bolingbrook, both of Ill.

[73] Assignee: Standard Oil Company (Indiana), Chicago, Ill.

[21] Appl. No.: 838,552

[22] Filed: Oct. 3, 1977

Related U.S. Application Data

[63] Continuation of Ser. No. 641,437, Dec. 17, 1975, abandoned.

[51] Int. Cl.$^3$ .......................... C08F 4/66; C08F 10/06
[52] U.S. Cl. ................................ 526/138; 252/429 B; 526/142; 526/351
[58] Field of Search .................. 252/429 B; 526/138, 526/142

[56] References Cited

U.S. PATENT DOCUMENTS

| | | | |
|---|---|---|---|
| 3,156,681 | 11/1964 | Kavesh et al. | 526/142 |
| 3,926,928 | 12/1975 | Karayannis et al. | 526/139 |
| 3,950,268 | 4/1976 | Karayannis et al. | 526/141 |
| 4,072,809 | 2/1978 | Rogan | 526/136 |

FOREIGN PATENT DOCUMENTS

| | | | |
|---|---|---|---|
| 998601 | 7/1965 | United Kingdom | 526/141 |
| 1147121 | 4/1969 | United Kingdom | 526/142 |

OTHER PUBLICATIONS

Boor, Journal of Polymer Science, Pt. A, vol. 3, pp. 995–1012 (1965).

*Primary Examiner*—Edward J. Smith
*Attorney, Agent, or Firm*—Stephen L. Hensley; William T. McClain; William H. Magidson

[57] ABSTRACT

Novel catalysts and processes are disclosed for producing highly crystalline polypropylene and highly crystalline copolymers of propylene with ethylene or propylene with other alpha-olefins. Such catalysts can reduce the amount of low-molecular-weight and, particularly, amorphous polymers formed without serious effect on the polymerization yield. These novel catalysts and processes involve improving an alkyl-aluminum compound-titanium chloride catalyst by using in combination small amounts of sulfur dioxide and isobutylvinyl ether. Such catalyst systems are useful in slurry polymerization, bulk polymerization and techniques in which polymerization is accomplished utilizing monomer substantially in the vapor phase.

6 Claims, No Drawings

CATALYST AND PROCESS FOR THE POLYMERIZATION OF ALPHA-OLEFINS

This is a continuation of application Ser. No. 641,437, filed Dec. 17, 1975 now abandoned.

SUMMARY OF THE INVENTION

This invention relates to novel catalysts and processes for the polymerization of propylene, its mixtures with ethylene or mixtures of propylene and other alpha-olefins to produce normally solid, highly crystalline polymers, and more specifically, to novel catalysts and processes for polymerization of propylene, its mixtures with ethylene or its mixtures with other $C_4$ to $C_8$ alpha-olefins to produce normally solid, highly crystalline, polymeric products wherein coproduced low-molecular-weight and, particularly, amorphous polymers are substantially reduced and polymerization yields are not substantially affected.

In accordance with the instant invention, propylene, its mixtures with ethylene or its mixtures with other $C_4$ to $C_8$ alpha-olefins are polymerized to normally solid, highly crystalline polymers using a slurry, bulk or vapor polymerization technique at monomer pressures of about atmospheric or above and moderate polymerization temperatures with a catalyst system comprising: (a) an alkylaluminum compound; (b) a chloride of titanium; (c) sulfur dioxide and (d) isobutylvinyl ether. The polymeric products produced using the above described catalyst systems can contain amounts of low-molecular-weight and amorphous components, as measured by room temperature extraction using n-hexane, as low as about one to two percent of the total polymer yield without seriously sacrificing polymer yield.

BACKGROUND OF THE INVENTION

Polymers of alpha-olefins prepared in the presence of ionic catalyst systems, as for example polypropylene prepared using a catalyst comprised of diethylaluminum chloride and a titanium trichloride, contain greater or lesser amounts of low-molecular-weight and, particularly, amorphous components which, when taken alone, are alkane soluble materials. The presence of these alkane-soluble materials in the polymers leads to difficulties during the fabrication of products therefrom and to inferior physical properties in the finished items, and hence are almost always removed in commercial processes for the production of polypropylene. Production of these components leads to an economic disability for the polymerization process as they have little usefulness and extra process steps are generally required to remove them from the commercial product.

In the past a number of materials and combinations thereof have been reported in the patent literature as useful additives to transition metal compound—alkylaluminum compound catalysts to reduce the alkane-soluble fraction produced during the polymerization process. Among these additives are amines, amine oxides, ethers, organophosphites, mixtures of organotin sulfides and amines, amine oxides or organophosphines, and combinations of hydrogen sulfide with amines, amine oxides, organophosphites or isobutylvinyl ether. The combinations containing organotin sulfides or hydrogen sulfide have been described as showing a greater effect on solubles reduction than either component of the combination alone. However, such mixtures have some disadvantages which include the cost of organotin sulfides and the odor and toxic properties of hydrogen sulfide.

In addition, in Japanese Patent Publication No. 7940/1969 a process for the preparation of highly crystalline polymers by polymerization of an alpha-olefin in the presence of a catalyst comprising aluminum sesquichloride, titanium trichloride and an alkylvinyl ether of eight or more carbon atoms is disclosed. Further, in British Pat. No. 1,147,121, polypropylene crystallinity is said to be aided without serious effect on the polymerization rate by catalyst combinations containing dialkylaluminum halides, titanium halide and among other unsaturated ethers, isobutylvinyl ether.

Since it is generally true that slowing an alpha-olefin polymerization down produces more of the crystalline polymer, and that additives, when their concentrations become high enough decrease the polymerization yield, the object of the work leading to the invention described herein is to obtain the maximum solubles reduction with the smallest negative effect upon yield. Even small changes in solubles and yield can have large economic effects when the amount of polymer produced per year is extremely large.

Now it has been found that by using sulfur dioxide and isobutylvinyl ether together as additives, catalyst systems are formed which when used for propylene polymerization result in a substantial reduction of the alkane solubles while not seriously affecting the total yield of polymer. Such systems can show better solubles reduction than shown by either additive when used alone. In addition, the systems taught herein can result in an improvement in solventless polymerization processes wherein the olefin is polymerized directly from the vapor or liquid phase. The catalyst systems disclosed herein may also be used for alpha-olefin polymerizations wherein supported or other types of high activity transition metal compound components are employed.

STATEMENT OF THE INVENTION

As shown in Table I below the n-hexane soluble fraction can be reduced in a polypropylene slurry polymerization when a diethylaluminum chloride-titanium trichloride catalyst is admixed with sulfur dioxide.

TABLE I

Comparison of Crystalline Polypropylene Yield and Solubles for Different Levels of Sulfur Dioxide

| Mol Ratio $Et_2AlCl/TiCl_3/SO_2$* | Crystalline Yield (grams polymer) | n-Hexane Solubles (percent) |
| --- | --- | --- |
| 1.5/1/0 | 25.1 | 4.6 |
|  | 26.0 | 3.8 |
| 2.5/1/0 | 24.2 | 4.9 |
|  | 25.7 | 3.8 |
| 2/1/0.01 | 26.6 | 4.3 |
| 2/1/0.02 | 26.8 | 3.6 |
| 2/1/0.04 | 25.4 | 2.9 |

*Et represents the ethyl radical

The results in Table I indicate that admixing the catalyst with a small amount of sulfur dioxide can result in lower solubles without serious effect on the yield. However, solubles reduction does not proceed very far with increasing sulfur dioxide concentration before the yield drops off.

TABLE II

Comparison of Crystalline Polypropylene Yield and Solubles for Different Levels of Isobutylvinylether

| Mol Ratio Et$_2$AlCl/TiCl$_3$/IBVE* | Crystalline Yield (grams polymer) | n-Hexane Solubles (Percent) |
|---|---|---|
| 1.5/1/0 | 25.1 | 4.6 |
|  | 26.0 | 3.8 |
| 2.5/1/0 | 24.2 | 4.9 |
|  | 25.7 | 3.8 |
| 2/1/0.04 | 31.6 | 6.6 |
| 0.08 | 31.5 | 3.6 |

*isobutylvinylether

The data set forth in Table II show that small amounts of isobutylvinylether can have a beneficial effect on crystalline yield but can also increase solubles. Larger amounts, however, can still have the same effect upon yield and reduce solubles somewhat. However, larger amounts of isobutylvinylether can cause other problems such as giving an odor to the final product so it is advantageous to keep the amount of ether as small as possible.

TABLE III

Comparison of Crystalline Polypropylene Yield and Solubles for Different Levels of Isobutylvinyl Ether and Sulfur Dioxide

| Mol Ratio Et$_2$AlCl/TiCl$_3$/SO$_2$/IBVE | Crystalline Yield (grams polymer) | n-Hexane Solubles (Percent) |
|---|---|---|
| 1.5/1/0.01/0.02 | 26.1 | 3.1 |
| /0.04 | 28.1 | 3.1 |
| /0.08 | 24.4 | 2.4 |
| /0.12 | 24.4 | 2.2 |

The data in Table III shows the beneficial effect upon propylene polymerization that can be obtained by admixing sulfur dioxide and isobutylvinylether with the catalyst.

The alkylaluminum compounds of the herein described invention are alkylaluminum derivatives wherein the alkyl radical contains one to about six carbon atoms and preferably are trialkylaluminums, mixtures thereof with an alkylaluminum dichloride or dibromide or a dialkylaluminum chloride or bromide, or dialkylaluminum chlorides or bromides. More preferably, this first material is a trialkylaluminum, mixtures thereof with either a dialkylaluminum chloride or an alkylaluminum dichloride, or a dialkylaluminum chloride. Most preferably, a dialkylaluminum chloride is used. The amount of this first component to be used is based upon the reactor size, the amount of the titanium component used and the amount of olefin to be polymerized as is known to one skilled in the art.

The titanium compounds preferred herein are titanium chlorides and, more preferably is a titanium trichloride or a composition based essentially thereon such as aluminum activated titanium trichloride and titanium trichlorides activated in other manners. The amount of this second material used is based upon the amount and composition of the particular polymer to be made and is known to one skilled in the art.

The amount of sulfur dioxide used is an effective amount, preferably less than a small fraction of the total amount of titanium compound employed, but up to so much as about twenty mol percent of the titanium compound. More preferably, an effective amount of sulfur dioxide up to about fifteen mol percent of the titanium compound is employed. Most preferably, an effective amount of sulfur dioxide up to about ten mol percent of the amount of titanium compound used is employed. Too much sulfur dioxide should not be used as it can kill the catalyst.

The second additive, isobutylvinyl ether, is desirably employed in an effective amount, and too much can kill the polymerization. Preferably, the sulfur dioxide-isobutylvinyl ether mol ratio is in the range from about six to one to about one to twenty-five and, more preferably, the sulfur dioxide-isobutylvinyl ether mol ratio is in the range from about three to one to about one to fifteen and, most preferably, the mol ratio employed is about two to one to about one to five.

A preferred mode of addition is to admix sulfur dioxide and the alkylaluminum compound and then admix the result with the second additive, e.g., isobutylvinyl ether and finally incorporate the titanium compound. However, any manner of making up the catalyst system of alkylaluminum compound, a titanium chloride, sulphur dioxide and isobutylvinyl ether can be used.

As is obvious to one skilled in the art, precautions should be taken to avoid oxygen and moisture contamination of the catalyst during its preparation and its transfer. Catalyst preparation can be carried out under an inert atmosphere using such gases as argon, nitrogen, helium, etc. Normally, during use no precautions need be taken as a positive pressure of monomer gas exists within the reactor.

The temperature at which the catalyst may be used is not critical. However, at temperatures below about 0° C. the rate of polymerization slows down and reactor residence times becomes unreasonably long whereas, at temperatures about 120° C., polymerization rates become too high and an increase in solubles production is found. Preferably, the temperature range in which the catalyst can be used is about 2° C. to about 95° C. Most preferably, the temperature range is about 50° C. to about 80° C.

The process of the invention can be carried out at a monomer pressure of about atmospheric or above. Pressures of about 20 p.s.i.g. to about 600 p.s.i.g. or higher are preferred depending upon which polymerization technique is used.

The organic liquid employed as the polymerization medium in the slurry technique can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as toluene or xylene, or halogenated aromatic compound such as chlorobenzene, chloronaphthalene or ortho-dichlorobenzene. The nature of the polymerization medium is subject to considerable variation, although the material employed should be liquid under the conditions of reaction and relatively inert. Saturated, aliphatic hydrocarbon liquids like hexane are preferably employed. Other solvents which can be used include ethylbenzene, isopropylbenzene, ethyltoluene, n-propylbenzene, diethylbenzenes, mono- and dialkylnaphthalenes, n-pentane, n-octane, isooctane and methylcyclohexane. The preparative media employed in practicing this invention can be advantageously purified prior to use in the polymerization reaction by contacting the material, for example, in distillation procedure or otherwise, with alkylaluminum compounds to remove undesirable trace impurities. Also, prior to polymerization the catalyst system can be contacted advantageously with a polymerizable alpha-olefin such as propylene.

The polymerization time is not critical and will usually be of the order of from thirty minutes to several hours in batch processes. Contact times of from one to four hours are commonly employed in autoclave-type reactions. When continuous slurry process is employed, the contact times in the polymerization zone can also be regulated as desired, and it is not necessary to employ reaction or contact times much beyond one-half to several hours since a cyclic system can be employed by separation of the polymer and return of the polymerization medium, if used, and excess monomer to the charging zone wherein the catalyst can be replenished and additional monomer introduced.

The invention is of particular importance in the preparation of highly-crystalline polypropylene, although it can be used for polymerizing mixtures of propylene and, preferably, up to about fifteen or so mol percent of ethylene or another alpha-olefin of up to about eight carbon atoms to form highly crystalline copolymers. Such copolymers include pure-black and terminal block types of copolymers.

The process and catalyst combination of this invention are normally used with an additive to control molecular weight such as dialkyl zinc compounds or hydrogen, preferably hydrogen. Solid polymers having molecular weights greater than about 50,000 and less than about 5,000,000 result thereby. The amount of hydrogen to be used depends upon the melt index and molecular weight distribution to be obtained and the condition of its use are well known to those skilled in the art.

While the invention herein is described in connection with the specific Examples below, it is to be understood that those are for illustrative purposes only. Many alternatives, modifications and variations will be apparent to those skilled in the art in the light of the below Examples and such alternatives, modifications and variations fall within the scope and spirit of the appended claims.

GENERAL EXPERIMENTAL PROCEDURE

The polymerizations described in the Examples were carried out in pressure bottles at 70° C. for two hours using 40 p.s.i.g. of propylene and 0.20 grams of aluminum activated titanium trichloride (AATiCl₃) added as a twenty-five percent slurry in mineral oil.

The catalyst was made up at room temperature by admixing the requisite amount of isobutylvinyl ether and the alkylaluminum compound and then admixing the result with titanium trichloride and finally incorporating the sulfur dioxide.

After polymerization the contents of the pressure bottle were killed with methanol and the solid filtered off, dried and weighed to give the Crystalline Yield. The supernatant liquid was evaporated to dryness and the residue weight, multiplied by 100 and divided by the Crystalline Yield plus the residue weight, was calculated to give the percent of n-Hexane Solubles.

The Crystalline Yield and n-Hexane Solubles have been corrected for variation in different batches of catalyst components, propylene, etc. by running a standard polymerization each time an experimental run was made and correcting the experimental run for any deviation of the standard's Crystalline Yield or n-Hexane Solubles. In each Example each Crystalline Yield and n-Hexane Solubles value is the average of two polymerization runs.

EXAMPLE I

| Mol Ratio $Et_2AlCl/TiCl_3/SO_2$ | Crystalline Yield (grams polymer) | n-Hexane Solubles (Percent) |
| --- | --- | --- |
| 2/1/0.01 | 26.6 | 4.3 |
| 2/1/0.02 | 26.8 | 3.6 |
| 2/1/0.04 | 25.4 | 2.9 |

EXAMPLE II

| Mol Ratio $Et_2AlCl/TiCl_3/SO_2/IBVE$ | Crystalline Yield (grams polymer) | n-Hexane Solubles (Percent) |
| --- | --- | --- |
| 1.5/1/0.01/0.02 | 26.1 | 3.1 |
| /0.04 | 28.1 | 3.1 |
| /0.08 | 24.4 | 2.4 |
| /0.12 | 24.3 | 2.2 |
| /0.02/0.02 | 24.4 | 3.0 |
| /0.04 | 26.8 | 2.5 |
| /0.80 | 26.1 | 2.2 |
| /0.12 | 26.4 | 2.2 |
| /0.04/0.02 | 25.0 | 2.4 |
| /0.04 | 25.4 | 2.0 |
| /0.08 | 25.4 | 1.9 |
| /0.12 | 23.6 | 1.9 |
| /0.06/0.02 | 22.1 | 1.9 |
| /0.04 | 21.4 | 1.8 |
| /0.08 | 21.8 | 1.8 |
| /0.12 | 22.4 | 2.1 |

EXAMPLE III

| Mol Ratio $Et_2AlCl/TiCl_3/SO_2/IBVE$ | Crystalline Yield (grams polymer) | n-Hexane Solubles (Percent) |
| --- | --- | --- |
| 2/1/0.01/0.02 | 27.7 | 3.4 |
| /0.04 | 28.1 | 2.8 |
| /0.08 | 29.3 | 3.0 |
| /0.12 | 29.0 | 2.7 |
| 0.02/0.02 | 27.2 | 3.2 |
| /0.04 | 28.9 | 2.6 |
| /0.08 | 26.2 | 2.7 |
| /0.12 | 26.1 | 2.3 |
| /0.16 | | |
| 0.04/0.02 | 25.9 | 2.6 |
| /0.04 | 25.9 | 2.6 |
| /0.08 | 26.5 | 2.6 |
| /0.12 | 26.7 | 2.4 |
| /0.16 | | |
| /0.06/0.02 | 23 | 2.2 |
| /0.04 | 23.7 | 1.9 |
| /0.08 | 23.6 | 1.7 |
| /0.12 | 23.4 | 1.5 |

COMPARATIVE EXAMPLE IV

| Mol Ratio $Et_2AlCl/TiCl_3/BTS*/COLL**$ | Crystalline Yield (grams polymer) | n-Hexane Solubles (Percent) |
| --- | --- | --- |
| 1.5/1/0.02/0.04 | 23.1 | 2.1 |
| 2/1/0.02/0.04 | 23.7 | 2.5 |

*bis-(tributyltin)sulfide
**2,4,6-collidine

What is claimed is:
1. An alpha-olefin polymerization catalyst composition which comprises:

(a) an alkylaluminum compound selected from the group consisting of a trialkylaluminum, a mixture of trialkylaluminum and an alkylaluminum dichloride of dibromide, a mixture of a trialkylaluminum and a dialkylaluminum chloride or bromide, and a dialkylaluminum chloride or bromide;

(b) an effective amount, ranging from about one to about twenty mol percent, of sulfur dioxide based upon the amount of titanium compound present;

(c) a titanium trichloride; and (d) an effective amount of isobutylvinyl ether;

said effective amounts being effective to reduce levels of alkane solubles produced during polymerization of alpha-olefins without substantial decreases in polymer yield.

2. The composition of claim 1 wherein said alkylaluminum compound is a dialkylaluminum chloride.

3. A process for the polymerization of propylene, a mixture of propylene and ethylene, or a mixture of propylene and another $C_4$ to $C_8$ alpha-olefin to form a highly crystalline polymeric substance, said process involving contacting under polymerization conditions said propylene or said mixture with a catalyst system comprising:

(a) an alkylaluminum compound selected from the group consisting of a trialkylaluminum, a mixture of a trialkylaluminum and an alkylaluminum dichloride or dibromide, a mixture of trialkylaluminum and a dialkylaluminum chloride or bromide, and a dialkylaluminum chloride or bromide;

(b) an effective amount, ranging from about one to about twenty mol percent, of sulfur dioxide based upon the amount of titanium compound present;

(c) a titanium trichloride; and (d) an effective amount of isobutylvinyl ether;

said effective amounts being effective to reduce levels of alkane solubles produced during said polymerization without substantial decreases in polymer yield.

4. The process of claim 3 wherein said alkylaluminum compound is a dialkylaluminum chloride.

5. A process for the polymerization of propylene, a mixture of propylene and up to about 15 mol percent ethylene, or a mixture of propylene and up to about 15 mol percent of another $C_4$ to $C_8$ alpha-olefin to form a highly crystalline polymeric substance, said process comprising contacting said propylene or said mixture at a temperature ranging from about 50° to about 80° C. and a monomer pressure ranging from about 20 to about 600 psig with a catalyst system comprising:

(a) a dialkylaluminum chloride or bromide having 1 to about 6 carbon atoms per alkyl radical, said dialkylaluminum chloride or bromide having been treated with an effective amount, ranging from about one to about twenty mol percent, of sulfur dioxide based on the amount of titanium trichloride;

(b) a titanium trichloride; and (c) an effective amount of isobutylvinyl ether;

said effective amounts being effective to reduce levels of alkane solubles produced during said polymerization without substantial decreases in polymer yield.

6. The process of claim 5 wherein said dialkylaluminum chloride is diethylaluminum chloride and the molar ratio of diethylaluminum chloride to titanium trichloride ranges from about 1.5:1 to about 2.5:1.

* * * * *

UNITED STATES PATENT AND TRADEMARK OFFICE
CERTIFICATE OF CORRECTION

PATENT NO. : 4,288,580

DATED : September 8, 1981

INVENTOR(S) : John B. Rogan et al.

It is certified that error appears in the above—identified patent and that said Letters Patent is hereby corrected as shown below:

Column 3, line 39, "compounds of" should read
-- compounds for --.

Column 5, line 24, "pure-black" should read -- pure block --.

Column 7, line 4, "of dibromide" should read -- or dibromide --.

Signed and Sealed this

Twenth-eighth Day of September 1982

[SEAL]

Attest:

GERALD J. MOSSINGHOFF

Attesting Officer    Commissioner of Patents and Trademarks